(12) United States Patent
Zander et al.

(10) Patent No.: US 10,864,896 B2
(45) Date of Patent: Dec. 15, 2020

(54) HYDRAULIC BLOCK FOR A HYDRAULIC ASSEMBLY OF A SLIP CONTROL SYSTEM OF A HYDRAULIC VEHICLE BRAKE SYSTEM

(71) Applicant: Robert Bosch GmbH, Stuttgart (DE)

(72) Inventors: Thomas Zander, Langenargen (DE); Michael Loeffler, Oberstaufen (DE)

(73) Assignee: Robert Bosch GmbH, Stuttgart (DE)

( * ) Notice: Subject to any disclaimer, the term of this patent is extended or adjusted under 35 U.S.C. 154(b) by 29 days.

(21) Appl. No.: 16/325,516

(22) PCT Filed: Sep. 6, 2017

(86) PCT No.: PCT/EP2017/072344
§ 371 (c)(1),
(2) Date: Feb. 14, 2019

(87) PCT Pub. No.: WO2018/046540
PCT Pub. Date: Mar. 15, 2018

(65) Prior Publication Data
US 2019/0210576 A1 Jul. 11, 2019

(30) Foreign Application Priority Data

Sep. 7, 2016 (DE) .......................... 10 2016 216 969
Dec. 21, 2016 (DE) .......................... 10 2016 225 757

(51) Int. Cl.
*B60T 8/36* (2006.01)
*F15B 13/08* (2006.01)
*B60T 17/04* (2006.01)

(52) U.S. Cl.
CPC .............. *B60T 8/368* (2013.01); *B60T 17/04* (2013.01); *B60T 17/043* (2013.01); *F15B 13/0814* (2013.01); *F15B 2211/625* (2013.01)

(58) Field of Classification Search
CPC ........ B60T 8/368; B60T 8/4081; B60T 17/02; B60T 17/04; B60T 17/043; F15B 13/0814; F15B 2211/625
See application file for complete search history.

(56) References Cited

U.S. PATENT DOCUMENTS

| 5,402,824 A * | 4/1995 | Hosoya | ................... B60T 8/362 137/454.2 |
| 5,681,097 A * | 10/1997 | Tackett | ..................... B60T 8/36 137/454.2 |

(Continued)

FOREIGN PATENT DOCUMENTS

| DE | 35 34 665 A1 | 4/1987 |
| DE | 43 13 384 A1 | 10/1993 |

(Continued)

OTHER PUBLICATIONS

International Search Report corresponding to PCT Application No. PCT/EP2017/072344, dated Nov. 7, 2017 (German and English language document) (10 pages).

*Primary Examiner* — Thomas W Irvin
(74) *Attorney, Agent, or Firm* — Maginot, Moore & Beck LLP

(57) ABSTRACT

A hydraulic block of a slip control system of a hydraulic vehicle brake system has receptacles for inlet valves and outlet valves of the slip control system arranged on a cover side, and receptacles for block valves, intake valves, and hydraulic accumulator on an opposite main side. All connecting bores for wheel brakes and a main brake cylinder are arranged on a transverse side and an eccentric chamber is arranged on an opposite transverse side of the hydraulic block.

8 Claims, 2 Drawing Sheets

(56) References Cited

U.S. PATENT DOCUMENTS

| | | | |
|---|---|---|---|
| 5,967,625 A | 10/1999 | Reuter et al. | |
| 6,688,707 B1* | 2/2004 | Dinkel | B60T 8/368 303/119.3 |
| 7,322,658 B2* | 1/2008 | Hinz | B60T 8/368 303/116.4 |
| 8,366,208 B2* | 2/2013 | Grundl | B60T 13/686 303/119.3 |
| 8,500,215 B2* | 8/2013 | Gastauer | B60T 8/368 303/10 |
| 8,523,295 B2* | 9/2013 | Bareiss | B60T 8/368 303/119.3 |
| 8,622,486 B2* | 1/2014 | Tandler | B60T 8/368 303/10 |
| 8,702,182 B2* | 4/2014 | Fischbach-Borazio | B60T 8/368 303/119.3 |
| 9,470,247 B2* | 10/2016 | Alaze | B60T 8/368 |
| 9,517,757 B2* | 12/2016 | Schlitzkus | B60T 8/368 |
| 9,586,565 B2* | 3/2017 | Fellmeth | B60T 8/368 |
| 9,688,256 B2* | 6/2017 | Weh | B60T 8/368 |
| 9,868,423 B2* | 1/2018 | Weh | F04B 9/047 |
| 10,093,294 B2* | 10/2018 | Mayr | B60T 8/368 |
| 10,308,232 B2* | 6/2019 | Mayr | B60T 8/368 |
| 10,407,040 B2* | 9/2019 | Jeon | B60T 13/146 |
| 10,625,722 B2* | 4/2020 | Weh | B23Q 3/06 |
| 2008/0258544 A1* | 10/2008 | Iyatani | F15B 13/0814 303/10 |
| 2008/0298982 A1* | 12/2008 | Pabst | B60T 8/368 417/273 |
| 2010/0207446 A1* | 8/2010 | Tandler | B60T 8/368 303/10 |
| 2010/0276925 A1* | 11/2010 | Bareiss | F15B 13/0814 285/125.1 |
| 2011/0036434 A1* | 2/2011 | Fischbach-Borazio | B60T 8/368 137/861 |
| 2011/0062773 A1* | 3/2011 | Misunou | F04C 2/10 303/6.01 |
| 2012/0326493 A1* | 12/2012 | Okamura | B60T 8/368 303/10 |
| 2013/0319562 A1* | 12/2013 | Weh | F15B 13/0803 137/884 |
| 2014/0062177 A1* | 3/2014 | Fellmeth | B60T 13/686 303/6.01 |
| 2014/0345720 A1* | 11/2014 | Alaze | B60T 13/686 137/561 A |
| 2015/0298675 A1* | 10/2015 | Mayr | B60T 8/4081 92/169.1 |
| 2015/0314760 A1* | 11/2015 | Weh | B60T 8/368 137/884 |
| 2015/0321650 A1* | 11/2015 | Schlitzkus | B60T 8/4872 137/78.1 |
| 2016/0107626 A1 | 4/2016 | Jeon | |
| 2016/0280197 A1* | 9/2016 | Mayr | B60T 17/02 |
| 2018/0056955 A1* | 3/2018 | Weh | B60T 8/368 |
| 2019/0031164 A1* | 1/2019 | Tandler | B60T 8/368 |
| 2020/0031327 A1* | 1/2020 | Mayr | F16K 27/003 |
| 2020/0070798 A1* | 3/2020 | Zander | B60T 8/368 |
| 2020/0094800 A1* | 3/2020 | Zander | B60T 17/043 |

FOREIGN PATENT DOCUMENTS

| | | |
|---|---|---|
| DE | 10 2005 055 057 A1 | 5/2007 |
| DE | 10 2006 037 496 A1 | 2/2008 |
| DE | 10 2006 059 924 A1 | 6/2008 |
| DE | 10 2012 211 340 A1 | 1/2014 |
| DE | 10 2015 117 568 A1 | 4/2016 |
| JP | S62-075183 A | 4/1987 |
| JP | H06-099795 A | 4/1994 |
| JP | H06-147345 A | 5/1994 |
| JP | H08-500890 A | 1/1996 |
| JP | 2014-046915 A | 3/2014 |
| WO | 95/01525 A1 | 1/1995 |

* cited by examiner

HYDRAULIC BLOCK FOR A HYDRAULIC ASSEMBLY OF A SLIP CONTROL SYSTEM OF A HYDRAULIC VEHICLE BRAKE SYSTEM

This application is a 35 U.S.C. § 371 National Stage Application of PCT/EP2017/072344, filed on Sep. 6, 2017, which claims the benefit of priority to Serial No. DE 10 2016 216 969.6, filed on Sep. 7, 2016 in Germany and to Serial No. DE 10 2016 225 757.9, filed on Dec. 21, 2016 in Germany, the disclosures of which are incorporated herein by reference in their entirety.

The disclosure relates to a hydraulic block for a hydraulic unit of a slip control system of a hydraulic vehicle brake system having the features of the preamble of claim 1.

Slip control systems are for example anti-locking, traction control and/or driving dynamics controls/electronic stability programs for which the abbreviations ABS, ASR, FDR/ESP are commonly used. Such slip control systems of hydraulic vehicle brake systems are known from passenger cars and motorcycles and are not explained in more detail here.

BACKGROUND

The core of such slip control systems is a hydraulic unit which comprises a hydraulic block which is equipped with hydraulic components of the slip control system and connected by brake lines to a brake master cylinder and to which one or more hydraulic wheel brakes are connected by brake lines. Hydraulic components are among others solenoid valves, hydraulic pumps (mostly piston pumps), non-return valves, hydraulic accumulators, damper chambers and pressure sensors. The hydraulic block is typically a cuboid metal block which serves for a mechanical attachment and hydraulic interconnection of the hydraulic components of the slip control system. Interconnection is to mean a hydraulic connection of the hydraulic components corresponding to a hydraulic circuit diagram of the slip control system.

The hydraulic block comprises receptacles for the hydraulic components of the slip control system. These are usually cylindrical counterbores, blind holes or through holes that are mostly stepped with regard to the diameter, which are provided in the hydraulic block and into which the hydraulic components are completely or partly introduced, for example press-fitted. Usually, hydraulic pumps for example are completely introduced into their receptacles in a hydraulic block whereas in the case of solenoid valves only a hydraulic part is usually introduced into a receptacle of a hydraulic block and an electromagnetic part of the solenoid valve projects from the hydraulic block. By way of a normally Cartesian drilling of the hydraulic block, the receptacles are connected to one another corresponding to the hydraulic circuit diagram of the slip control system. Cartesian means bores provided in the hydraulic block parallel or at a right angle to one another and to surfaces and edges of the hydraulic block. Equipped with the hydraulic components, the hydraulic block forms a hydraulic unit.

For connecting the hydraulic block to a brake master cylinder and for connecting wheel brakes to the hydraulic block, known hydraulic blocks comprise connecting bores for brake lines. The connecting bores are typically cylindrical counterbores or blind holes which for example comprise internal threads for a screw connection with a screw nipple of a brake line or which are threadless for press-fitting and clinching of a press-fit nipple of a brake line preferentially according to the self-clinching technique. Self-clinching means that the press-fit nipple when being press-fitted into the connecting bore of the hydraulic block clinches itself pressure-tight in the connecting bore of the hydraulic block subject to plastic deformation of material of the hydraulic block.

The disclosure publication DE 10 2006 059 924 A1 discloses a hydraulic block for a hydraulic unit of a slip control system of a hydraulic vehicle brake system, in which all receptacles for solenoid valves of the slip control system are arranged in a cover side, which can also be referred to as valve side, of a cuboid hydraulic block. The cover side is one of the two large sides of the cuboid hydraulic block, which is not cube-shaped, but longer and wider than thick. The cover side can be square or rectangular.

Centrally in a longitudinal center plane and offset relative to a transverse center plane of the hydraulic block, the known hydraulic block comprises an eccentric chamber in a base side. The base side, which can also be referred to as motor side, is located opposite the cover side and congruent with the same. The eccentric chamber is a cylindrical counterbore stepped the diameter and is with regard to provided for accommodating a pump eccentric, which serves for driving two hydraulic pumps. The pump eccentric is driven by an electric motor as pump motor which is attached outside to the motor side of the hydraulic block.

Two receptacles for hydraulic pumps, namely piston pumps, are arranged in the known hydraulic block so as to be located opposite one another radially with respect to the eccentric chamber. The two receptacles for the hydraulic pumps are thus arranged in longitudinal sides of the hydraulic block or lead into these. The two piston pumps forming the hydraulic pumps can also be considered as pump elements.

Four connecting bores for brake lines, which lead to hydraulic wheel brakes, are attached in the case of the known hydraulic block in a transverse side and two connecting bores for brake lines, which originate from a two-circuit brake master cylinder, in the motor side.

The disclosure publication DE 10 2005 055 057 A1 discloses a hydraulic block for a hydraulic unit of a slip control system of a hydraulic vehicle brake system which altogether comprises six receptacles for hydraulic pumps namely three hydraulic pumps for each of two brake circuits. The receptacles for the hydraulic pumps, are arranged in two planes star-shaped with an offset of 120° about an eccentric chamber, so that two of the receptacles each lead obliquely into longitudinal sides of the hydraulic block.

SUMMARY

The hydraulic block according to the disclosure is provided for a hydraulic unit of a slip control system of a hydraulic vehicle brake system. The in particular cuboid hydraulic block comprises receptacles for valves of the slip control system, in particular solenoid valves, in two sides located opposite one another which are referred to as first valve side and second valve side here. Preferentially, receptacles for all inlet valves and/or receptacles for all outlet valves of the slip control system are arranged in a valve side, which is referred to here as first valve side, and/or receptacles for all isolation valves and/or all suction valves are arranged in the valve side located opposite, which is referred to here as second valve side.

By way of the inlet valves and the outlet valves the wheel brakes are connected to the slip control system. The inlet valves and the outlet valves form wheel brake pressure modulation valve arrangements, with which wheel braking pressures in the wheel brakes can be wheel-individually regulated. With the isolation valves, a brake master cylinder can be hydraulically isolated from the vehicle brake system during a slip control and by way of the suction valves, hydraulic pumps can be directly connected to the brake master cylinder or a brake fluid reservoir for a rapid build-up.

Preferentially, the valve sides are a base side and a cover side of the hydraulic block. In the case of a hydraulic block that is longer and wider than thick, the base side and the cover side are the large sides of the hydraulic block. They can be square or rectangular.

The arrangement of the receptacles for the valves of the slip control system in opposite sides makes possible a more compact, in particular in one direction shorter but instead possibly thicker hydraulic block.

Advantageous configurations and further developments of the disclosure are described below.

The receptacles for the valves are preferentially arranged in rows that are parallel to an edge of the first or the second valve side. Here, in particular the receptacles for the inlet valves, the receptacles for the outlet valves, the receptacles for the isolation valves and the receptacles for the suction valves are arranged in a row respectively, wherein for example two receptacles for isolation valves and two receptacles for suction valves can be jointly arranged in a row.

In contrast to the prior art, one embodiment provides for an eccentric chamber for a pump eccentric for driving one or more hydraulic pumps not in one of the valve sides but in an adjoining side, which is referred to here as motor side, since an electric motor as pump motor for driving the pump eccentric is attached to said side. When the two valve sides are the base side and the cover side of the hydraulic block, the eccentric chamber is arranged in a longitudinal side or a transverse side, which, as already mentioned, is referred to as motor side.

One or more receptacles for one or more hydraulic accumulators of the slip control system are provided in one of the two valve sides in another embodiment, preferentially in the second valve side with the receptacles for the isolation valves and/or the receptacles for the suction valves.

For a slip control system with more than one hydraulic pump for each brake circuit, some embodiments provide for a receptacle for a hydraulic pump in a side adjoining the two valve sides, if applicable a receptacle for a further hydraulic pump in an opposite side and a receptacle for a hydraulic pump obliquely to the sides with the other receptacles for hydraulic pumps. Provided that the valve sides are the base side and the cover side of the hydraulic block, the adjoining sides are longitudinal sides or transverse sides. The sides with the receptacles for the hydraulic pumps are referred to as pump sides here. The hydraulic pumps are in particular piston pumps but can also be considered as pump elements. This configuration of the disclosure makes possible a space-saving arrangement of for example six receptacles for hydraulic pumps, of which in each case three are assigned to one of two brake circuits.

A bore is to mean a through-hole or a blind hole independently of the manner of its making. Thus, a bore need not be produced by boring but can for example be produced by milling or in another way.

All features of the description, of the claims and of the drawing can be carried out for embodiments of the disclosure individually or in any combinations.

Embodiments according to the disclosure of the hydraulic block are possible even without receptacles for valves in opposite sides.

BRIEF DESCRIPTION OF THE DRAWINGS

In the following, the disclosure is explained in more detail by way of two embodiments shown in the drawing. In the drawings:

In FIGS. 1 and 2, the hydraulic block is drawn transparently in order to show its bore arrangement.

DETAILED DESCRIPTION

Figure 1:
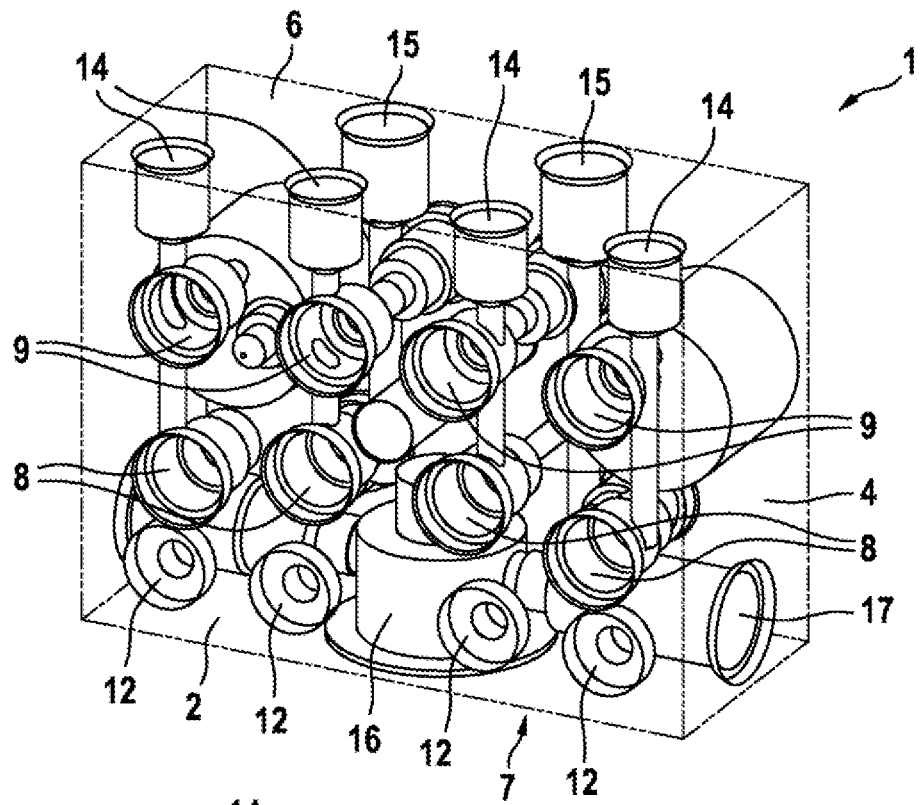
FIG. 1 shows a hydraulic block according to the disclosure in a perspective representation looking at a first valve side.
Figure 2:
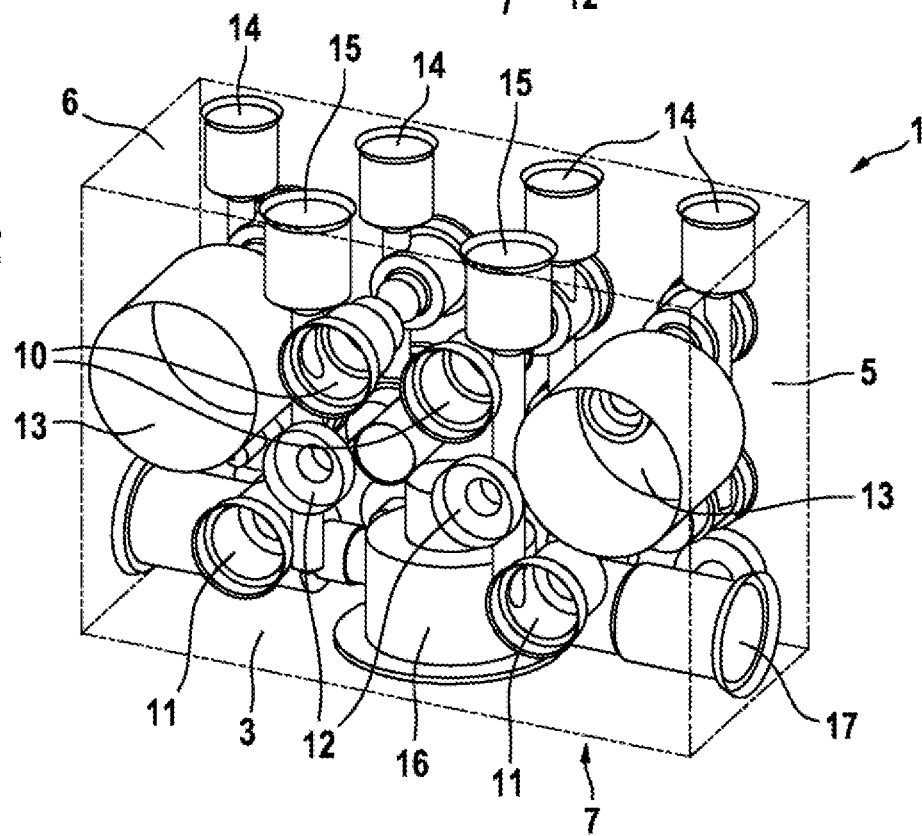
FIG. 2 shows the hydraulic block from FIG. 1 in a perspective representation looking at an opposite second valve side.

The hydraulic block 1 according to the disclosure that is drawn transparently in FIGS. 1 and 2 is provided for a hydraulic unit of a slip control system of a hydraulic vehicle brake system that is otherwise not shown. Such slip control systems are for example anti-locking, traction control and/or driving dynamics control systems/electronic stability programs for which the abbreviations ABS, ASR, FDR/ESP are commonly used. The hydraulic block 1 is a cuboid metal block which in the terminology used here is wider than long and longer than thick. It has a rectangular base side and a congruent cover side located opposite the base side, which are referred to here as first valve side 2 and as second valve side 3, two longitudinal sides located opposite one another, which are referred to here as first and second pump side 4, 5, and two transverse sides located opposite one another, which are referred to here as connecting side 6 and as motor side 7. The valve sides 2, 3 are the largest sides of the hydraulic block 1. The longitudinal sides need not be longer than the transverse sides and are shorter with the hydraulic block 1 drawn in FIGS. 1 and 2 (they are longer in FIG. 3).

In the two valve sides 2, 3, the hydraulic block 1 comprises receptacles 8, 9, 10, 11 for solenoid valves of the slip control system which are not drawn, namely in the first valve side 2 four receptacles 8 for inlet valves and four receptacles 9 for outlet valves and in the opposite second valve side 3, two receptacles 10 for isolation valves and two receptacles 11 for suction valves. The four receptacles 9 for the outlet valves are attached in a first row parallel to the connecting side 6 and the four receptacles 8 for the inlet valves are attached in a second row likewise parallel to the connecting side 6 in the first valve side 2 of the hydraulic block 1. In a third row again parallel to the connecting side 6, four receptacles 12 for pressure sensors of the slip control system of the hydraulic vehicle brake system which are not drawn are attached in the first valve side 2 of the hydraulic block 1.

The receptacles 8, 9, 10, 11 for the solenoid valves are cylindrical counterbores in the hydraulic block 1 that are stepped with regard to the diameter, into which the solenoid valves of the slip control system which are not shown are press-fitted by a so-called self-clinching technique. This means that the solenoid valves during press-fitting plastically deform material of the hydraulic block 1 so that they are mechanically held and sealed in a pressure-tight manner in the receptacles 8, 9, 10, 11. The receptacles 12 for the pressure sensors are low cylindrical counterbores into which the pressure sensors that are not shown are inserted and clinched in a pressure-tight manner.

In the opposite second valve side 3, the hydraulic block 1 comprises two cylindrical counterbores as receptacles 13 for hydraulic accumulators. The receptacles 13 for the hydraulic accumulators have a larger diameter and are deeper than the receptacles 8, 9, 10, 11 for the solenoid valves. Shape and size are not mandatory for the receptacles 13. The receptacles 13 for the hydraulic accumulators are approximately arranged in the hydraulic block 1 in a transverse center plane, i.e. approximately in a middle between the connecting side 6 and the motor side 7. The two receptacles 10 for isolation valves are arranged in the hydraulic block 1 in the second valve side 3 between the two receptacles 13 for the hydraulic accumulators and with respect to their centers, slightly offset in the direction of the connecting side 6. The two receptacles 10 for the isolation valves are arranged in the hydraulic block 1 at the same height as the receptacles 9 for the outlet valves, i.e., at the same distance from the connecting side 6. The two receptacles 11 for the suction valves are arranged between the receptacles 13 for the hydraulic accumulators and the motor side 7. They are arranged slightly nearer to the longitudinal center plane of the hydraulic block 1 than the receptacles 13 for the hydraulic accumulators, which are arranged near to the two pump sides 4, 5 and they are arranged further away from the longitudinal center plane of the hydraulic block 1 than the receptacles 10 for the isolation valves. Between the receptacles 11 for the suction valves and the receptacles 13 for the hydraulic accumulators, two further receptacles 12 for pressure sensors are attached in the second valve side 3 of the hydraulic block 1. They are nearer to the longitudinal center plane of the hydraulic block 1 than the receptacles 11 for the suction valves.

All connecting bores 14, 15 for brake lines are provided in the connecting side 6 of the hydraulic block 1. Specifically, four connecting bores 14 for the connection of hydraulic wheel brakes, which wheel brakes are not shown, are arranged in a row that is parallel to the valve sides 2, 3 and near the first valve side 2 in the connecting side 6, and two connecting bores 15 for a two-circuit brake master cylinder, which is likewise not shown, are arranged symmetrically to the longitudinal center plane of the hydraulic block 1 near the second valve side 3 in the connecting side 6. The connecting bores 14, 15 are cylindrical counterbores with for example internal threads for a screw connection of brake lines with screw nipples or without internal thread for a connection of brake lines by clinching. The clinching can be effected by a so-called self-clinching technique using special nipples which, when the nipples are press-fitted into the connecting bores 14, 15, deform the material of the hydraulic block 1 so that the nipples are mechanically held and sealed in a pressure-tight manner in the connecting bores 14, 15. The connecting bores 14, 15 need not be produced by boring, but can also be produced in another way, for example milled.

In the motor side 7, which is located opposite the connecting side 6, the hydraulic block 1 in its longitudinal center has an eccentric chamber 16 which in the drawn embodiment of the disclosure is a cylindrical counterbore that is stepped with regard to the diameter, the diameter of which is larger and deeper than the receptacles 8, 9, 10, 11 for the solenoid valves. The eccentric chamber 16 is provided for the installation and for a rotational mounting of a pump eccentric that is not drawn for driving two piston pumps as hydraulic pumps of the slip control system of the hydraulic vehicle brake system that is not shown. The pump eccentric is driven by an electric motor as pump motor which is not shown subject to the intermediate connection of a mechanical step-down gearing if required. The electric motor which is not drawn is fastened to the motor side 7 on the outside, which is why this side of the hydraulic block 1 is referred to as motor side 7 here.

Radially relative to the eccentric chamber 16 and equiaxially opposite one another, two pumps bores 17 are provided in the hydraulic block 1, which open on the two pump sides 4, 5. The pump bores 17 are cylindrical holes that are stepped with regard to the diameter, which pass from the pump sides 4, 5 through to the eccentric chamber 16. These are provided for the installation of piston pumps, that are not shown, as hydraulic pumps of the slip control system of the hydraulic vehicle brake system that is not shown. Typically, such piston pumps are press-fitted into the pump bores of a hydraulic block. The pump bores 17 need not be produced by boring but can also be produced in another way, for example milled.

The hydraulic block 1 is bored symmetrically relative to a longitudinal center plane, which means that the receptacles 8, 9, 10, 11, 12, 13 for the hydraulic components of the slip control system and the line bores connecting the receptacles are provided in the hydraulic block 1 mirror-symmetrically relative to the longitudinal center plane. The longitudinal center plane is located in a middle between the two pump sides 4, 5. Individual deviations from the symmetry are not excluded. Equipped with the solenoid valves, hydraulic pumps and further hydraulic components of a slip control system which are not shown of a hydraulic vehicle brake system which is not shown, the hydraulic block 1 forms a hydraulic unit which forms the core of a hydraulic part of the slip control system. Valve domes, which are not drawn, of the solenoid valves project from the hydraulic block 1 in opposite directions from the valve sides 2, 3 located opposite one another.

Figure 3:
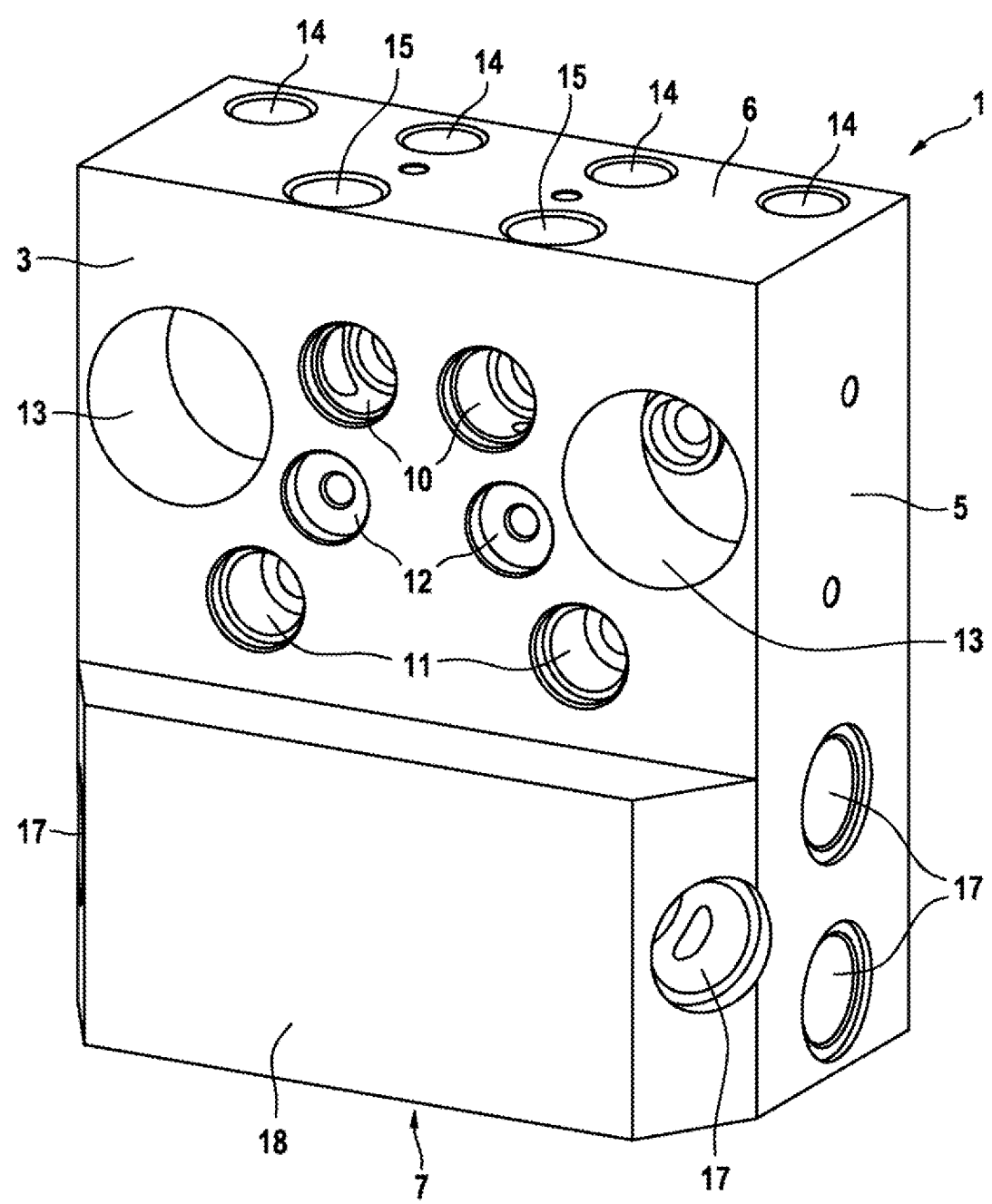
FIG. 3 shows a second embodiment of a hydraulic block according to the disclosure with a viewing direction corresponding to FIG. 2.

In contrast with the hydraulic block 1 drawn in FIGS. 1 and 2, the hydraulic block 1 in FIG. 3 does not comprise two—one for each brake circuit—but six pump bores 17, namely three pump bores 17 for each of two brake circuits. In FIG. 3, the hydraulic block 1 is drawn non-transparently. The viewing direction in FIG. 3 is the same as in FIG. 2, thus the second valve side 3 is visible. Because of the additional four pump bores 17, the hydraulic block 1 from FIG. 3 is longer than the hydraulic block 1 from FIGS. 1 and 2. In addition to the two pump bores 17, which the hydraulic block 1 from FIGS. 1 and 2 comprises, the hydraulic block 1 from FIG. 3 comprises a further pump bore 17 in each pump side 4, 5. This total of four pump bores 17 are all located in an imaginary plane that is parallel to and in a middle between the two valve sides 2, 3. The two remaining of the total of six pump bores 17 are provided in the hydraulic block 1 obliquely relative to the four pump bores 17, which open into the two pump sides 4, 5, and in a longitudinal direction of the hydraulic block 1 between the four pump bores 17. The two remaining pump bores 17 are likewise arranged radially relative to the eccentric chamber 16, which is not visible in FIG. 3. For accommodating the two remaining pump bores 17, the hydraulic block 1 has a step-like elevation 18 on the second valve side 3, which can be provided on the second valve side 3 as a one-piece component part of the hydraulic block 1 or as an originally separate part.

All other receptacles 8, 9, 10, 11, 12, 13, connecting bores 14, 15 and the eccentric chamber 16 are arranged in the hydraulic block 1 of FIG. 3 identically to the FIGS. 1 and 2. Same elements in all figures are marked with the same reference numbers.

The invention claimed is:

1. A hydraulic block for a hydraulic unit of a slip control system of a hydraulic vehicle brake system, comprising:
   a first valve side in which a plurality of outlet valve receptacles configured to receive outlet valves and a plurality of inlet valve receptacles configured to receive inlet valves are defined;
   a second valve side opposite the first side and in which a plurality of isolating valve receptacles configured to receive isolating valves, a plurality of suction valves configured to receive suction valves, and at least one accumulator receptacle configured to receive a hydraulic accumulator are defined;
   two pump sides in which pump bores configured to receive hydraulic pumps are defined, the two pump sides arranged opposite one another and adjoining the first valve side; and
   a connecting side in which wheel brake connecting bores configured to connect to wheel brakes and master cylinder connecting bores configured to connect to a brake master cylinder are defined, the connecting side adjoining the first valve side and the two pump sides.

2. The hydraulic block as claimed in claim 1, wherein the plurality of inlet valve receptacles, the plurality of outlet valve receptacles, the plurality of isolation valve receptacles, and/or the plurality of suction valve receptacles are arranged in a parallel row that is parallel to an edge of the first or the second valve side.

3. The hydraulic block as claimed in claim 1, wherein the plurality of inlet valve receptacles comprises four inlet valve receptacles and/or the plurality of outlet valve receptacles comprises four outlet valve receptacles and/or the plurality of isolating valve receptacles comprises two isolating valve receptacles and/or the plurality of suction valve receptacles comprises two suction valve receptacles defined in the second valve side.

4. The hydraulic block as claimed in claim 1, further comprising:
   a motor side in which an eccentric chamber configured to receive a pump eccentric for driving a the hydraulic pump is defined, the motor side adjoining the first and second valve sides.

5. The hydraulic block as claimed in claim 1, further comprising:
   at least one sensor receptacle configured for a pressure sensor defined in at least one of the first valve side and the second valve side.

6. The hydraulic block as claimed in claim 1, wherein at least one of the pump bores is arranged in the hydraulic block obliquely relative to the first and second valve sides.

7. The hydraulic pump as claimed in claim 1, wherein all of the wheel brake connecting bores are defined in the connecting side.

8. A hydraulic block for a hydraulic unit of a slip control system of a hydraulic vehicle brake system, comprising:
   a plurality of receptacles for valves in a first valve side and in an opposite second valve side;
   a first pair of pump bores configured for receiving hydraulic pumps in a first pump side adjoining the first and the second valve side;
   a second pair of pump bores configured for receiving hydraulic pumps in a second pump side located opposite the first pump side; and
   a third pair of pump bores configured for receiving hydraulic pumps obliquely relative to the first and relative to the second pump side.

\* \* \* \* \*